United States Patent
Nair

(10) Patent No.: US 8,788,325 B2
(45) Date of Patent: Jul. 22, 2014

(54) TECHNIQUES FOR GENERATING A PRODUCT PATH WITH CUSTOM ADVERTISEMENTS

(75) Inventor: Praveen Chandran Nair, Altamonte Springs, FL (US)

(73) Assignee: NCR Corporation, Duluth, GA (US)

( * ) Notice: Subject to any disclaimer, the term of this patent is extended or adjusted under 35 U.S.C. 154(b) by 730 days.

(21) Appl. No.: 12/592,602

(22) Filed: Nov. 30, 2009

(65) Prior Publication Data

US 2011/0131087 A1    Jun. 2, 2011

(51) Int. Cl.
  *G06Q 30/00*    (2012.01)
  *G06Q 90/00*    (2006.01)

(52) U.S. Cl.
  CPC .................................. *G06Q 90/00* (2013.01)
  USPC ....................................................... 705/14.1

(58) Field of Classification Search
  CPC ..................................................... G06Q 90/00
  USPC ....................................................... 705/14.1
  See application file for complete search history.

(56) References Cited

U.S. PATENT DOCUMENTS

| 6,604,681 | B1 * | 8/2003 | Burke et al. | 235/383 |
| 6,604,682 | B2 * | 8/2003 | Wakamiya et al. | 235/462.01 |
| 2007/0273558 | A1 * | 11/2007 | Smith et al. | 340/995.1 |

* cited by examiner

*Primary Examiner* — Daniel Lastra
(74) *Attorney, Agent, or Firm* — Joseph P. Merhle

(57) ABSTRACT

Techniques for generating a product path with custom advertisements are provided. A kiosk interacts with a consumer to acquire a product or service search within a facility. The kiosk generates a path to the product or service starting from the kiosk and ending at a location with the facility where the product or service can be found. Additionally, custom advertisements are interspersed throughout the path for other goods and services available at the facility. The kiosk then delivers the path with the custom advertisements to the customer for locating the product or service.

20 Claims, 3 Drawing Sheets

US 8,788,325 B2

TECHNIQUES FOR GENERATING A PRODUCT PATH WITH CUSTOM ADVERTISEMENTS

BACKGROUND

Increasingly, stores, malls, amusement parks, tourist areas, sporting arenas are becoming very large and geographically dispersed. The small mom and pop stores are dying breeds. This is especially true with the advent of Walmart and the desire of enterprises to compete on the same scale as Walmart. Consequently, most stores sell a huge variety of goods and services to customers and want customers to come to those stores for all their purchasing needs.

One issue with this "large is better" mentality is that often the consumer is overwhelmed and literally lost once inside a particular facility. Generally, staff is supposed to be around to assist the consumer with questions and provide guidance. However, in an effort to reduce cost many stores are grossly understaffed and in rough times positions such as these are usually the first to go. So, more often than not customers wonder the aisles looking for what they came for, sometimes it benefits the store because the customer buys some things that they did not intend to buy. But, sometimes it harms the store because consumers become frustrated or angry and leave without making any purchase and opt to go somewhere else that is not quite so large to make their purchase.

SUMMARY

In various embodiments, techniques for generating a product path with custom advertisements are presented. According to an embodiment, a method for generating a product path with custom advertisements is provided. Specifically, a kiosk and a customer interact with one another; the customer provides a search that is acquired by the kiosk, the search directed to a product or service within a store or a mall that the customer wants to locate. Next, the kiosk searches map data for the store or the mall using the search to find a location within the store or within the mall for the product or service. Then, the kiosk generates a path from the kiosk to the location and custom advertisements are inserted or superimposed along the path. Finally, the kiosk provides the path with the custom advertisements for the customer to use to reach the location.

DETAILED DESCRIPTION

Figure 1:
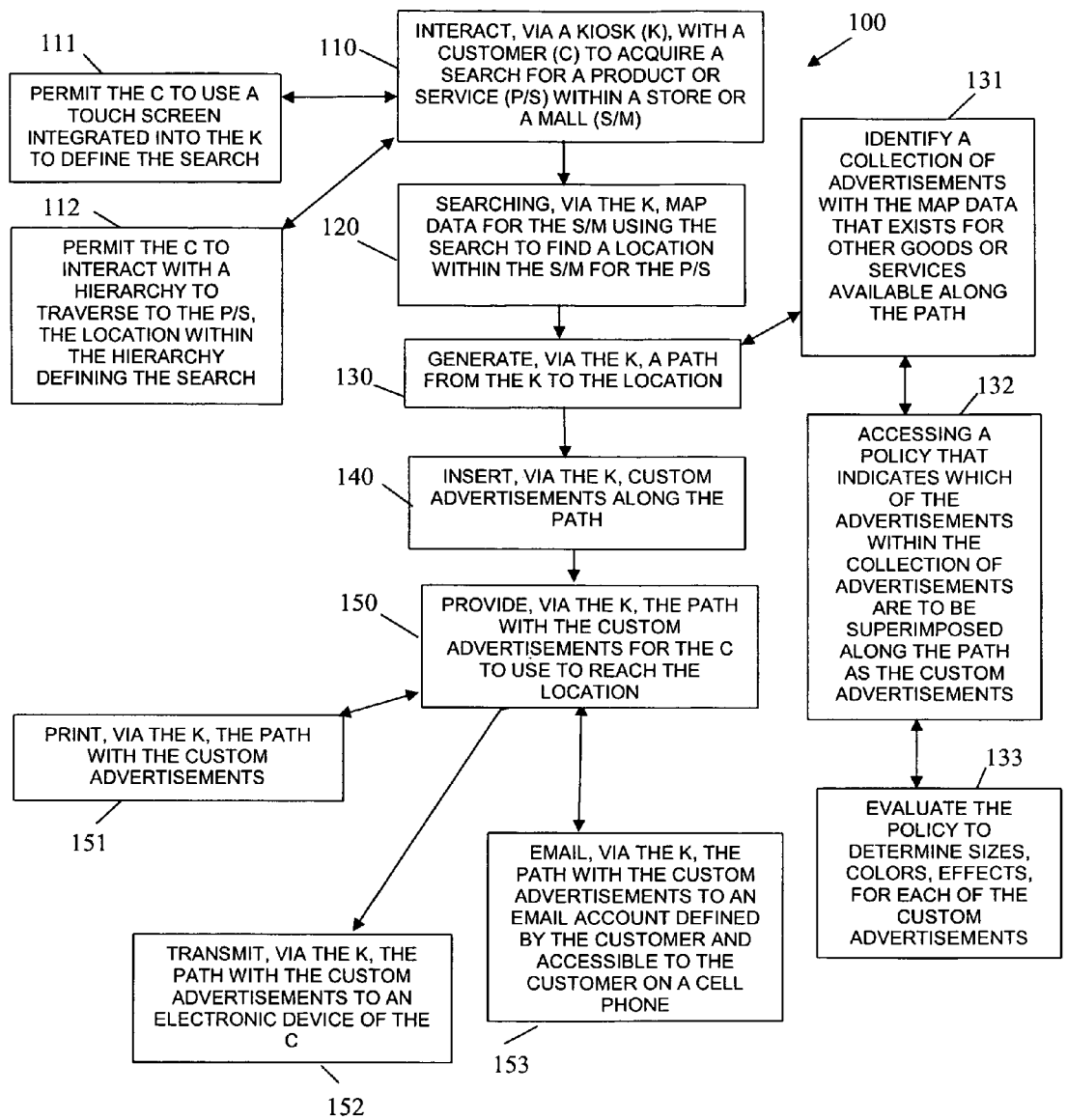
FIG. 1 is a diagram of a method for generating a product path with custom advertisements, according to an example embodiment.

FIG. 1 is a diagram of a method 100 for generating a product path with custom advertisements, according to an example embodiment. The method 100 (hereinafter "product path mapping service") is implemented as instructions residing on a computer-readable storage medium and executed by one or more processors. The processors are specifically configured to process the product path mapping service. The product path mapping service operates over a network. The network is wireless, wired, or a combination of wired and wireless.

In an embodiment, the product path mapping service executes on processors embedded within a kiosk. The kiosk is located at a store, mall, amusement park, tourist center, and the like.

At 110, the product path mapping service interacts, via the kiosk, with a customer to acquire a search for a produce to service within a store or a mall. It is noted that the teachings presented herein can be used within any facility, such as an amusement park, a tourist center, a sports arena, and the like.

According to an embodiment, at 111, the product path mapping service permits the customer to use a touch screen integrated into the kiosk to define the search.

In another situation, at 112, the product path mapping service permits the customer to interact with a hierarchy to traverse to the product or service, the location within the hierarchy is used to define the search.

At 120, the product path mapping service searches, via the kiosk, map data for the store or mall using the search to find a location within the store or mall for the product or service. That is the entire store or mall and its layout is defined in the map data and the location of the kiosk is fixed or configured in the kiosk. So, the product path mapping service uses the location of the kiosk and the map data to find the location of the product or service desired by the customer.

Thus, at 130, the product path mapping service generates, via the kiosk, a path from the kiosk's location to the location of the product or service.

According to an embodiment, at 131, the product path mapping service identifies a collection of advertisements with the map data that exists for other goods or services available along the path. So, there are other products (goods) or services within a same store but along a different aisle or floor or within a different store along a walkway within the mall to the store have the product or service desired by the customer.

Continuing with the embodiment of 131 and at 132, the product path mapping service accesses a policy that indicates which of the advertisements within the collection of advertisements are to be superimposed along the path as the customer advertisements.

Still continuing with the embodiment of 132 and at 133, the product path mapping service evaluates the policy to determine sizes, colors, and effects for each of the custom advertisements. So, each custom advertisement can be custom presented along the path. Vendors, distributors, and/or manufacturers can pay or negotiate for placement and appearance of their advertisements along the path.

At 140, the product path mapping service inserts, via the kiosk, the custom advertisements along the path.

At 150, the product path mapping service provides, via the kiosk, the path with the custom advertisements for the customer to use to reach the location of the product or service.

In an embodiment, at 151, the product path mapping service prints, via the kiosk, the path with the custom advertisements.

In another scenario, at 152, the product path mapping service transmit, via the kiosk, the path with the custom advertisements to an electronic device of the customer, such as a cell phone, personal digital assistant (PDA), and the like.

In still another situation, at 153, the product path mapping service emails, via the kiosk, the path with the custom advertisements to an email account defined by the customer and accessible to the customer on a cell phone.

Figure 2:
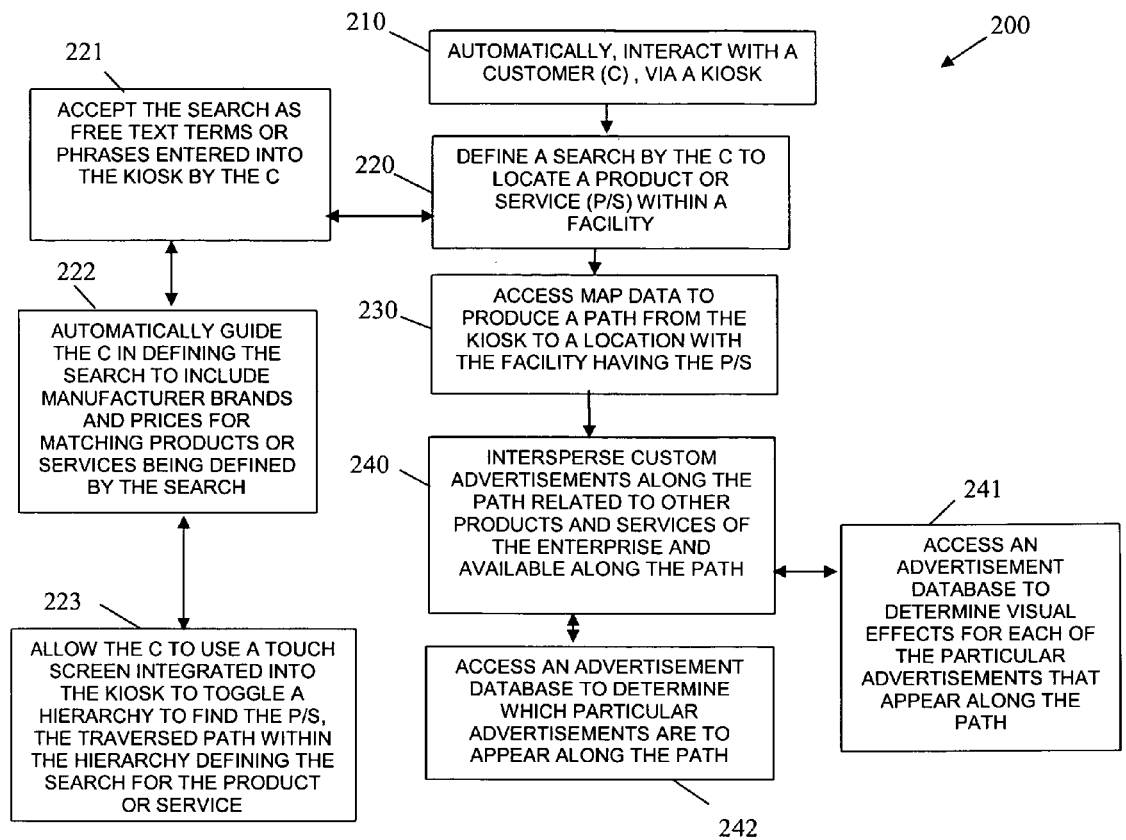
FIG. 2 is a diagram of another method for generating a product path with custom advertisements, according to an example embodiment.

FIG. 2 is a diagram of another method 200 for generating a product path with custom advertisements, according to an example embodiment. The method 200 (hereinafter "kiosk direction service") is implemented as instruction within a computer-readable storage medium that execute on one or more processors, the processors specifically configured to execute the kiosk direction service. The kiosk direction service is operational over a network; the network is wired, wireless, or a combination of wired and wireless.

The kiosk direction service represents another and in some cases enhanced perspective of the product path mapping service, presented above with respect to the discussion of the FIG. 1.

At 210, kiosk direction service automatically interacts with the customer, via a kiosk. The remaining processing depicted in the FIG. 2 describes the other interactions between the customer and the kiosk.

At 220, the kiosk direction service defines a search by the customer to locate a product or a service within a facility.

According to an embodiment, at 221, the kiosk direction service accepts the search as a free text terms or phrases entered into the kiosk by the customer.

Continuing with the embodiment of 221 and at 222, the kiosk direction service automatically guides the customer in defining the search by including manufacturer brands and prices for matching products or services being defined by the search.

Still continuing with the embodiment of 222 and at 223, the kiosk direction service allows the customer to use a touch screen integrated into the kiosk to toggle a hierarchy to find the product or service. The traversed path within the hierarchy defines the search for the product of the service.

At 230, the kiosk direction service access map data to product a path from the kiosk to a location within the facility having the product or service.

At 240, the kiosk direction service intersperses custom advertisements along the path related to other products and services of the enterprise and available along the path.

According to an embodiment, at 241, the kiosk direction service access an advertisement database to determine visual effects for each of the particular advertisements that appear along the path.

In still another case, at 242, the kiosk direction service accesses an advertisement database to determine which particular advertisement are to appear along the path.

Figure 3:
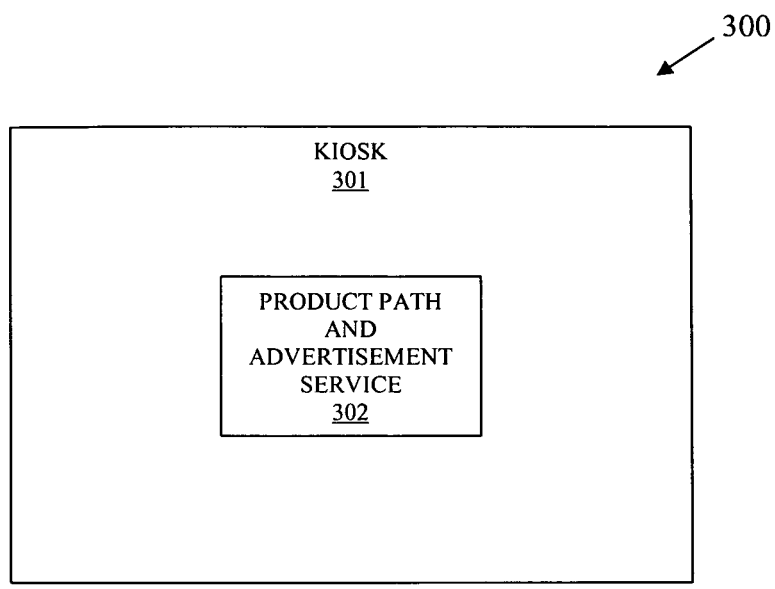
FIG. 3 is a diagram of a product path and advertisement system, according to an example embodiment.

FIG. 3 is a diagram of a product path and advertisement system 300, according to an example embodiment. The product path and advertisement system 300 is implemented as instructions residing in computer-readable storage media and to execute on one or more processors of a network.

The product path and advertisement system 300 implements, inter alia, the methods 100 and 200 of the FIGS. 1 and 2, respectively.

The product path and advertisement system 300 includes a kiosk 301 and a product path and advertisement service 302. Each of these and their interactions with one another will now be discussed in turn.

The kiosk 301 includes one or more processors having instructions that execute on the processors to perform such things as the methods 100 and 200 of the FIGS. 1 and 2, respectively. The kiosk 301 can be situated at a store, a mall, a tourist center, an amusement park a sports facility, and the like.

The kiosk 301 is configured to interact with a customer to acquire a search defined by the customer for a particular good or service that the customer wants to locate within a facility associated with the kiosk.

Additionally, the kiosk 301 is configured to interact with the product path and advertisement service 302. Specifically, the kiosk 301 is configured to interact with a customer to acquire a search for a product or service within a facility. The kiosk 301 is located at the facility and the kiosk 301 is further configured to interact with the product and advertisement service 302 to locate the product or service within the facility and to generate a path from the kiosk 301 to a location having the product or service.

The product path and advertisement service 302 is implemented as instructions that reside within the kiosk 301 and that execute on the processors of the kiosk 301. Example processing features associated with product path and advertisement service 302 were presented in detail above with reference to the methods 100 and 200 of the FIGS. 1 and 2, respectively.

The product path and advertisement service 302 is integrated into the kiosk and executes on the one or more processors. Example aspects of the product path and advertisement service 302 were presented in detail above with reference to the methods 100 and 200 of the FIGS. 1 and 2, respectively.

The product and advertisement service 302 is further configured to intersperse custom advertisements along the path for other goods and services of interest to the customer.

According to an embodiment, the product and advertisement service 302 selects the advertisements based on a profile associated with the customer as defined in a customer-relationship management database.

In another embodiment, the product and advertisement service 302 highlights or makes particular advertisements more noticeable within the path in response to value supplied by advertisers of the particular advertisements.

In another case, the product and advertisement service 302 sends the path with advertisements to a printer integrated into the kiosk for print output to the customer.

Continuing with the previous embodiment, the product and advertisement service 302 selectively causes coupons to some of the other goods and services to be printed on a backside of the print output.

It is now appreciated how a kiosk can be used to product directions to consumers at facilities. The directions are presented as a path and along the path advertisements are displayed to entice the consumer to purchase other goods or services available at the facility. The selection of the custom advertisements and the appearance and size of the custom advertisements can be dictated by policy and the policy developed via bids of enterprises to have their advertisements prominently presented on the paths provided to the consumers.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method to execute on a processor configured to execute the method, comprising:
   interacting, via a kiosk, with a customer to acquire a search for a product or service within a store or a mall;
   searching, via the kiosk, map data for the store or mall using a kiosk location to find a location within the store or within the mall for the product or service, the kiosk location for the kiosk is within the store or within the mall and is configured within the kiosk with the map data;
   generating, via the kiosk, a path from the kiosk to the location using the configured kiosk location and the location within the store or within the mall identified in the map data;
   inserting, via the kiosk, custom advertisements along the path;
   providing, via the kiosk, the path with the custom advertisements for the customer to use to reach the location.

2. The method of claim 1, wherein interacting further includes permitting the customer to use a touch screen integrated into the kiosk to define the search.

3. The method of claim 1, wherein interacting further includes permitting the customer to interact with a hierarchy to traverse to the product or service, the location within the hierarchy defining the search.

4. The method of claim 1, wherein searching further includes identifying a collection of advertisements with the map data that exists for other goods or services available along the path.

5. The method of claim 4, wherein identifying further includes accessing a policy that indicates which of the advertisements within the collection of advertisements are to be superimposed along the path as the custom advertisements.

6. The method of claim 5, wherein accessing further includes evaluating the policy to determine sizes, colors, effects, for each of the custom advertisements.

7. The method of claim 1, wherein providing further includes printing, via the kiosk, the path with the custom advertisements.

8. The method of claim 1, wherein providing further includes transmitting, via the kiosk, the path with the custom advertisements to an electronic device of the customer.

9. The method of claim 1, wherein providing further includes entailing, via the kiosk, the path with the custom advertisements to an email account defined by the customer and accessible to the customer on a cell phone.

10. A processor-implemented method to execute on a processor configured to execute the method, the method, comprising:
    automatically, interacting with a customer, via a kiosk having the processor, the interaction including:
      defining a search by the customer to locate a product or service within a facility using a kiosk location for the kiosk configured within map data for the facility;
      accessing the map data to produce a path from the kiosk location to a location with the facility having the product or service; and
      interspersing custom advertisements along the path related to other products and services of the enterprise and available along the path.

11. The method of claim 10, wherein defining further includes accepting the search as free text terms or phrases entered into the kiosk by the customer.

12. The method of claim 11, wherein accepting further includes automatically guiding the customer in defining the search to include manufacturer brands and prices for matching products or services being defined by the search.

13. The method of claim 10, wherein defining further includes allowing the customer to use a touch screen integrated into the kiosk to toggle a hierarchy to find the product or service, the traversed path within the hierarchy defining the search for the product or service.

14. The method of claim 10, wherein interspersing further includes accessing an advertisement database to determine which particular advertisements are to appear along the path.

15. The method of claim 14, wherein interspersing further includes accessing an advertisement database to determine visual effects for each of the particular advertisements that appear along the path.

16. A processor implemented system, comprising:
    a kiosk having one or more processors and interfaced to a network; and
    a product and advertisement service integrated into the kiosk and to execute on the one or more processors;
    the kiosk is configured to interact with a customer to acquire a search for a product or service within a facility, the kiosk located at the facility, the kiosk further configured to interact with the product and advertisement service to locate the product or service within the facility based on a kiosk location for the kiosk and to generate a path from the kiosk to a location having the product or service, the kiosk location within the facility configured in the kiosk with the map data and the path produced from the kiosk location within the facility to the location, the product and advertisement service further configured to intersperse custom advertisements along the path for other goods and services of interest to the customer.

17. The system of claim 16, wherein the product and advertisement service selects the advertisements based on a profile associated with the customer as defined in a customer relationship management database.

18. The system of claim 16, wherein the product and advertisement service highlights or makes particular advertisements more noticeable within the path in response to value supplied by advertisers of the particular advertisements.

19. The system of claim 16, wherein the product and advertisement service sends the path with advertisements to a printer integrated into the kiosk for print output to the customer.

20. The system of claim 19, wherein the product and advertisement service selectively causes coupons to some of the other goods and services to be printed on a backside of the print output.

* * * * *